United States Patent
Lee et al.

(10) Patent No.: US 6,411,340 B1
(45) Date of Patent: Jun. 25, 2002

(54) CHROMINANCE SIGNAL PROCESSING APPARATUS IN VIDEO SIGNAL PROCESSING SYSTEM

(75) Inventors: Ho-Seong Lee; Hong-Ki Park, both of Suwon-shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/444,575

(22) Filed: Nov. 19, 1999

(30) Foreign Application Priority Data

Dec. 22, 1998 (KR) ............................................. 98-57167

(51) Int. Cl.[7] ............................. H04N 9/64; H04N 9/67
(52) U.S. Cl. ...................... 348/649; 348/651; 348/654; 348/708; 348/713; 348/659; 348/660
(58) Field of Search ................................ 348/649, 651, 348/654, 659, 660, 713, 708; H04N 9/64

(56) References Cited

U.S. PATENT DOCUMENTS

| | | | | |
|---|---|---|---|---|
| 4,402,005 A | * | 8/1983 | Lewis, Jr. ..................... | 358/28 |
| 4,558,351 A | * | 12/1985 | Fling et al. .................... | 358/28 |
| 4,609,938 A | * | 9/1986 | Suzuki et al. ................. | 358/26 |
| 5,181,100 A | * | 1/1993 | Hodgson ..................... | 358/37 |
| 5,432,564 A | * | 7/1995 | Tonami ....................... | 348/646 |
| 5,461,429 A | * | 10/1995 | Konishi et al. .............. | 348/656 |
| 5,953,059 A | * | 9/1999 | Lee ............................. | 348/240 |
| 6,026,179 A | * | 2/2000 | Brett .......................... | 382/162 |
| 6,072,526 A | * | 6/2000 | Hashimoto .................. | 348/223 |
| 6,229,580 B1 | * | 5/2001 | Inoue .......................... | 348/649 |

* cited by examiner

*Primary Examiner*—John W. Miller
*Assistant Examiner*—Paulos Natnael
(74) *Attorney, Agent, or Firm*—Sughrue Mion, PLLC (57) ABSTRACT

A chrominance signal processing apparatus in a video signal processing system which has a simple configuration capable of achieving chrominance signal control and RGB transform functions using a single circuit. The chrominance signal processing apparatus includes a key input unit provided with a plurality of control keys for chrominance signal controls, the key input unit serving to generate key data in response to a manipulation of desired control keys by the user, a chrominance signal control coefficient computing unit adapted to calculate chrominance signal control coefficients in response to a user's request for chrominance signal controls received via the key input unit, respectively, the calculation of the chrominance signal control coefficients being carried out in accordance with a matrix computation for variations in chrominance signal coefficients respectively associated with the chrominance signal control coefficients to be calculated, and a chrominance signal control and RGB transform unit adapted to conduct the requested chrominance signal controls for chrominance signals separated from a video signal, along with a luminance signal, by a comb filter of the video signal processing system, based on the chrominance signal control coefficients received from the chrominance signal control coefficient computing unit, and adding the controlled chrominance signals to the luminance signal, respectively, thereby outputting R, G, and B video signals.

7 Claims, 10 Drawing Sheets

PRIOR ART

FIG. 3

PRIOR ART

FIG. 4

PRIOR ART

FIG. 5

PRIOR ART

FIG. 6

PRIOR ART

FIG. 7

PRIOR ART

FIG. 8

PRIOR ART

FIG. 10

CHROMINANCE SIGNAL PROCESSING APPARATUS IN VIDEO SIGNAL PROCESSING SYSTEM

BACKGROUND OF THE INVENTION

1. Field of the Invention

The present invention relates to a video signal processing system, and more particularly to a chrominance signal processing apparatus in a video signal processing system. This application is based on Korean patent application 98-57167, which is hereby incorporated by reference for all purposes.

2. Description of the Related Art

Generally, video signal processing systems include, for example, color televisions, video cassette tape recorders, and video color printers. In such a video signal processing system, a composite video signal is divided into a luminance signal and a chrominance signal. The chrominance signal is then processed by various processes such as a color gain control, a color hue control, and flesh tone control, etc. After being processed by such processes, the resultant chrominance signal is transformed, along with the luminance signal, to an original RGB signal which is, in turn, output. To this end, the video signal processing system should be equipped with not only a circuit for transforming the luminance and chrominance signals to an RGB signal format, but also a variety of chrominance signal control circuits for conducting various controls for the chrominance signal including a color gain control, a color hue control, and flesh tone control, etc. according to the user's intention.

Figure 1:
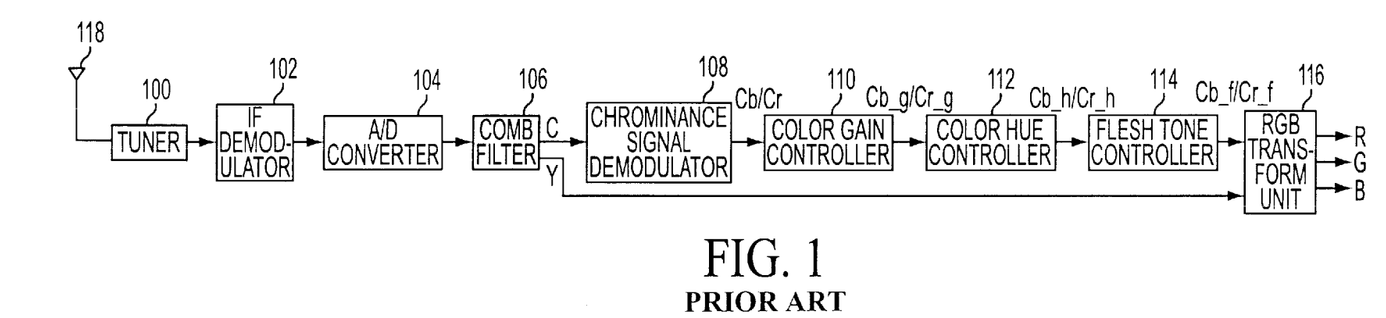
FIG. 1 is a block diagram schematically illustrating a digital color television receiver.

FIG. 1 is a block diagram schematically illustrating a digital color television receiver which is a video signal processing system as mentioned above. Referring to FIG. 1, a plurality of channels carrying television video signals are received by tuner 100 via an antenna 118. The tuner 100 allows a user to select a channel from a plurality of channels, and outputs the television video signals of the selected channel to an intermediate frequency (IF) demodulator 102. The IF demodulator 102 demodulates the television video signal received therein into an IF signal which is sent to an analog/digital (A/D) converter 104. In the A/D converter 104, the video signal outputted from the IF demodulator 102 in the IF-modulated state is converted to a digital signal using binary-sampling in a pulse code modulation (PCM) fashion. A comb filter 106 receives the digital data from the A/D converter 104 and separates a luminance signal Y and a chrominance signal C from the received digital data. The chrominance signal C from the comb filter 106 is applied to a chrominance signal demodulator 108 which demodulates the received chrominance signal C into an R-Y chrominance signal Cr and a B-Y chrominance signal Cb. A color gain controller 110 receives the chrominance signals Cr and Cb from the chrominance signal demodulator 108, conducts a color gain control for those received signals, and outputs the resultant signals, namely, gain-controlled chrominance signals Cb_g and Cr_g, to a color hue controller 112. The color hue controller 112 controls the gain-controlled chrominance signals Cb_g and Cr_g in accordance with a color hue control coefficient, and then outputs the resultant signals, namely, hue-controlled chrominance signals Cb_h and Cr_h, to a flesh tone controller 114. In the flesh tone controller 114, the hue-controlled chrominance signals Cb_h and Cr_h are controlled in terms of flesh tone in accordance with a flesh tone control coefficient. The resultant signals, namely, flesh tone-controlled chrominance signals Cb_f and Cr_f, are applied to an RGB transform unit 116. The RGB transform unit 116 processes the flesh tone-controlled chrominance signals Cb_f and Cr_f along with the luminance signal Y, thereby transforming these signals to an original RGB signal which is finally outputted.

Figure 2:
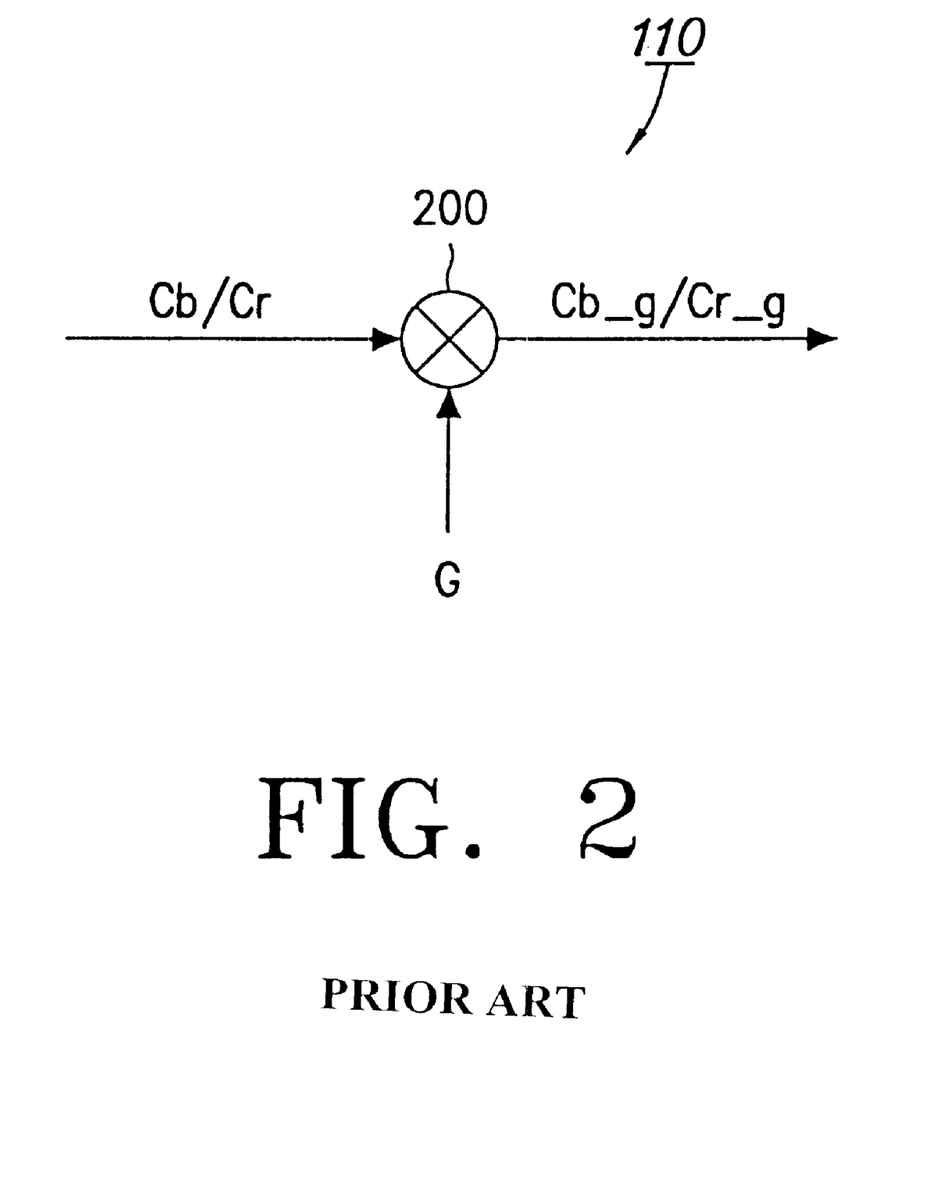
FIG. 2 is a block diagram illustrating a detailed circuit configuration of a color gain controller shown in FIG. 1.
Figure 4:
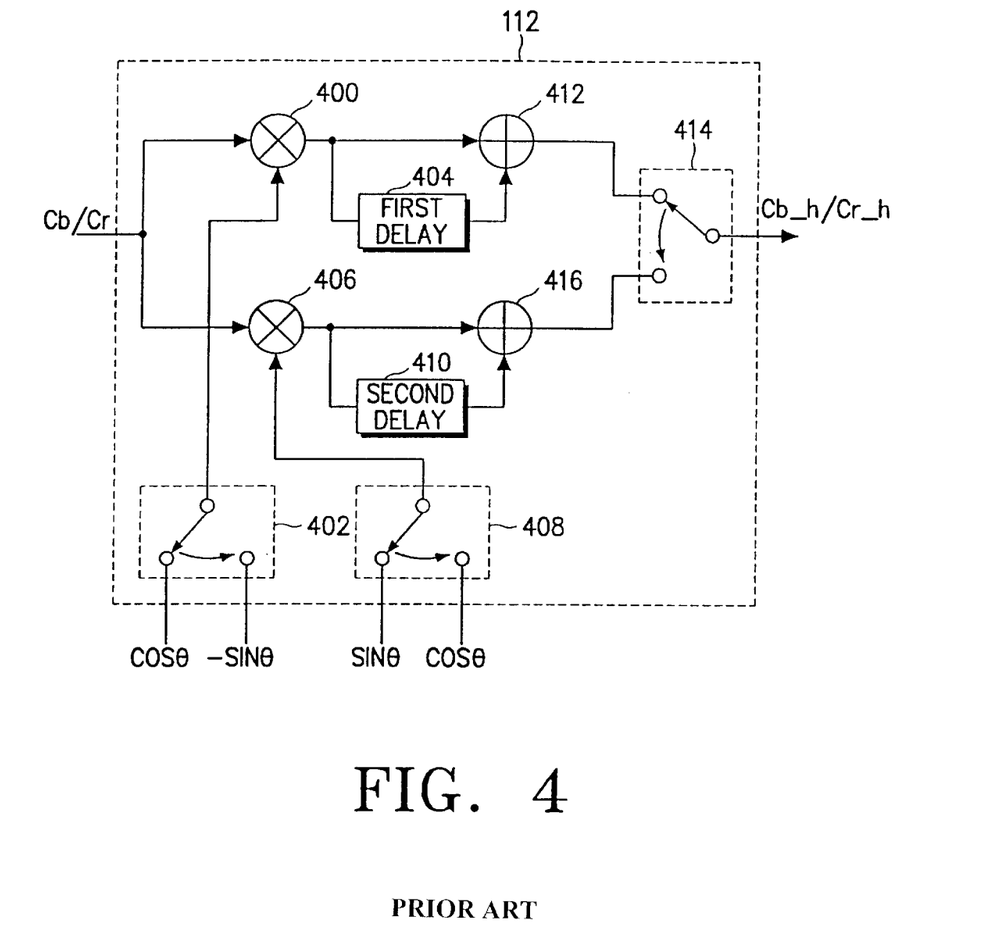
FIG. 4 is a block diagram illustrating a detailed circuit configuration of a color hue controller shown in FIG. 1.
Figure 6:
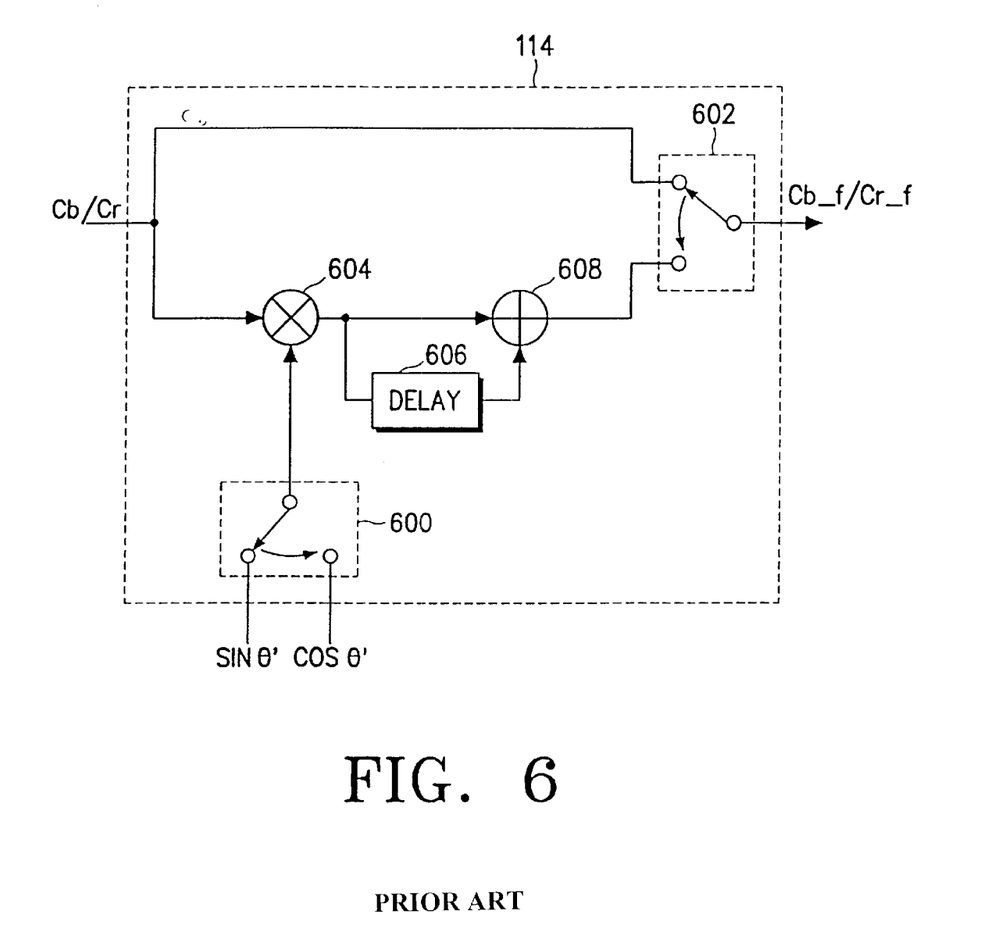
FIG. 6 is a block diagram illustrating a detailed circuit configuration of a flesh tone controller shown in FIG. 1.
Figure 7:
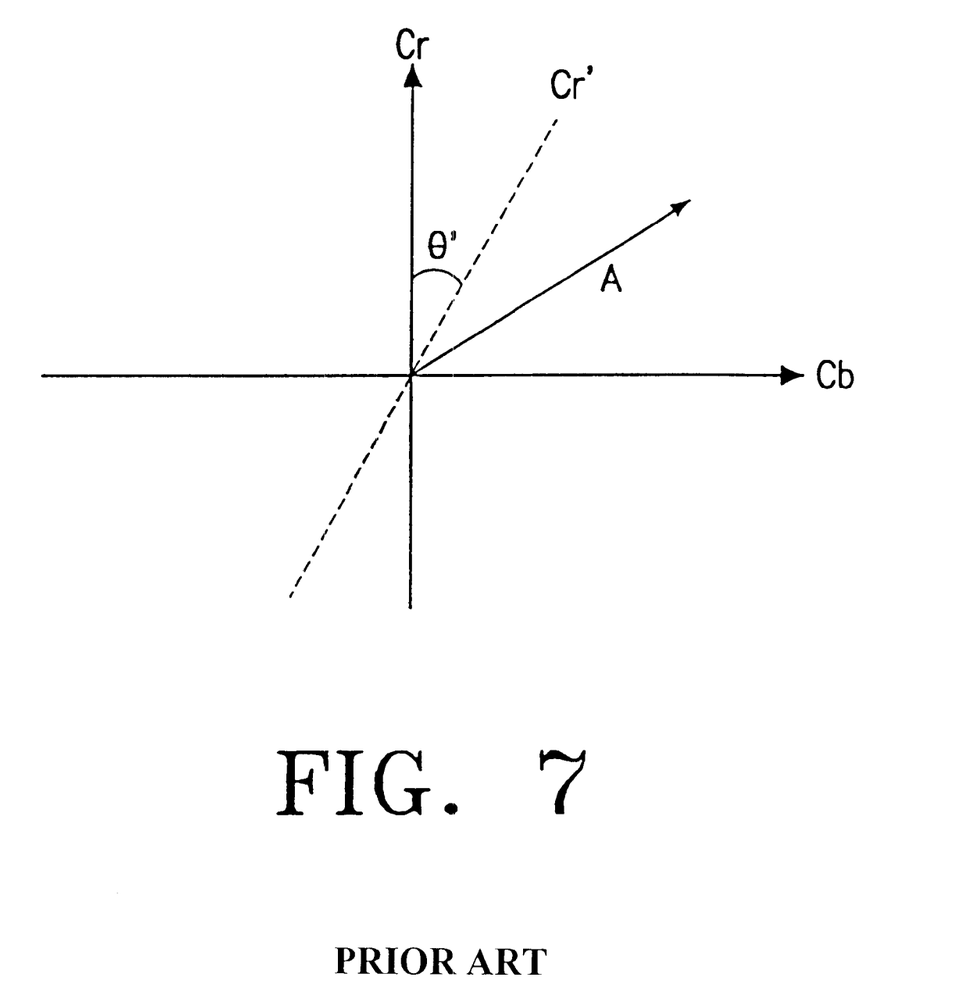
FIG. 7 is a color vector diagram of a flesh tone-controlled chrominance signal.

FIGS. 2, 4, and 6 illustrate detailed circuit configurations of the color gain controller 110, color hue controller 112 and flesh tone controller 114, respectively. Now, the operations of these controllers will be described in more detail, in conjunction with FIGS. 2, 4, and 6.

Figure 3:
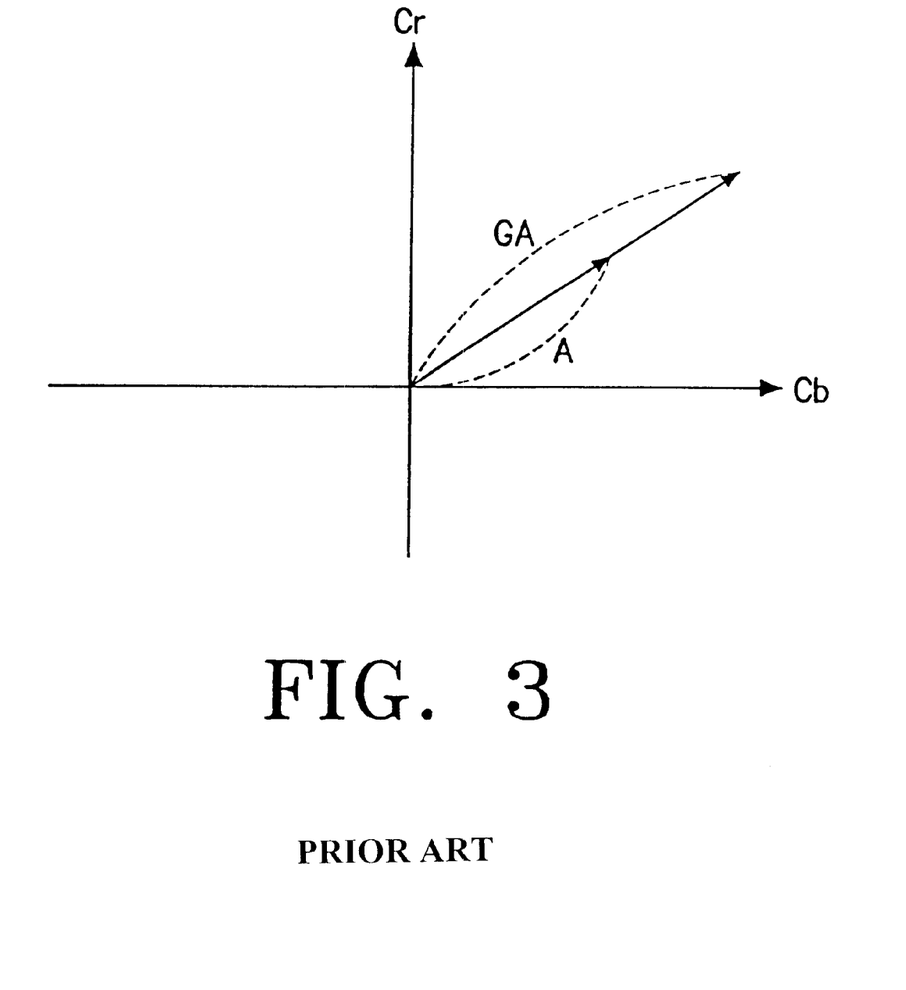
FIG. 3 is a color vector diagram of a color gain-controlled chrominance signal.

FIG. 2 is a block diagram illustrating a detailed circuit configuration of the color gain controller 110. As shown in FIG. 2, the color gain controller 110 multiplies the chrominance signals Cb and Cr received from the chrominance signal demodulator 108 of FIG. 1 by a color gain control coefficient G received from a multiplier 200, respectively. That is, the color gain controller 110 serves to vary the value of a vector A representing the chrominance signal C in proportion to the gain control coefficient G, as shown in FIG. 3 illustrating a color vector diagram of the chrominance signal C with the chrominance signal Cb as an abscissa and the chrominance signal Cr as an ordinate. The values of output signals from the color gain controller 110 respectively associated with the luminance signal Y and chrominance signals Cb and Cr can be expressed as follows:

$$Y = Y$$

$$Cb\_g = Cb \times G$$

$$Cr\_g = Cr \times G \qquad \text{[Equation 1]}$$

The above Equation 1 may be expressed in the form of a matrix equation as follows:

$$\begin{bmatrix} Y \\ Cb\_g \\ Cr\_g \end{bmatrix} = \begin{bmatrix} 1 & 0 & 0 \\ 0 & G & 0 \\ 0 & 0 & G \end{bmatrix} \times \begin{bmatrix} Y \\ Cb \\ Cr \end{bmatrix} \qquad \text{[Equation 1a]}$$

In the above Equation 1a, "Cb" represents a normalized value of the B-Y chrominance signal, "Cr" represents a normalized value of the R-Y chrominance signal, and "G" represents the color gain control coefficient.

Figure 5:
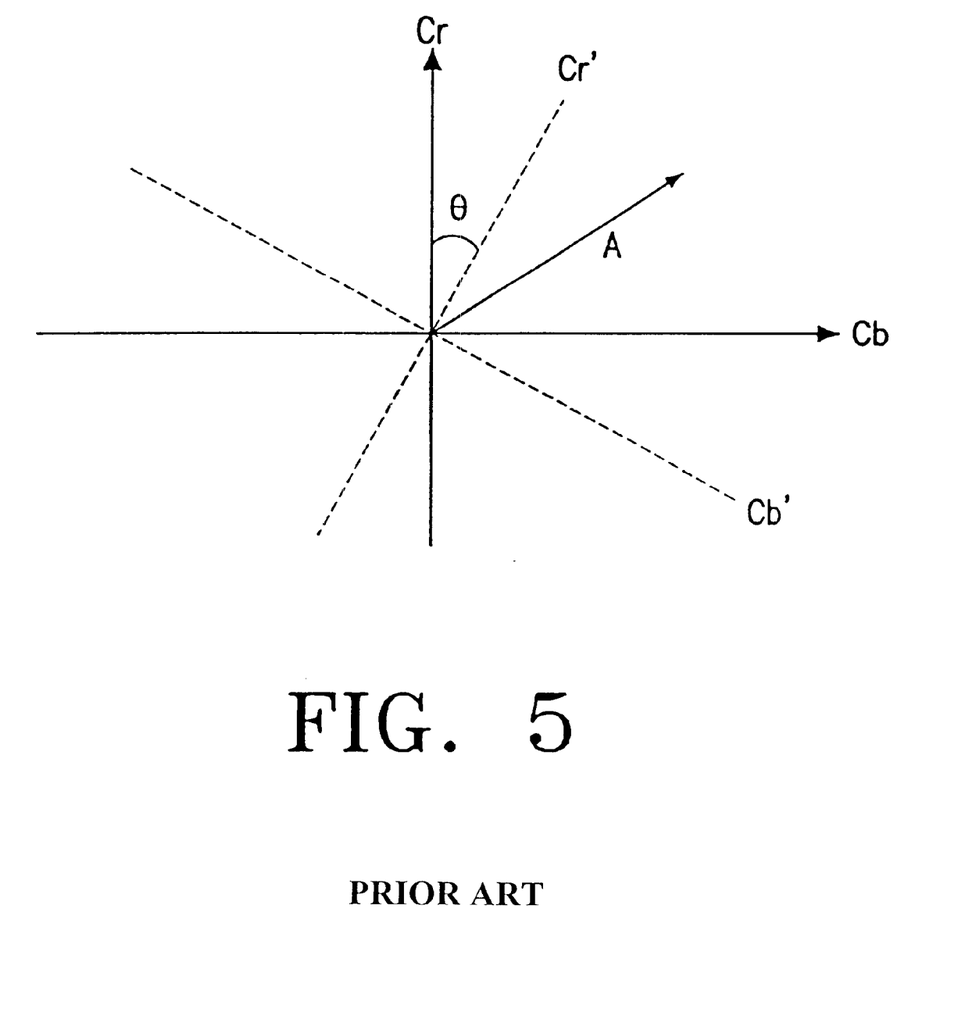
FIG. 5 is a color vector diagram of a color hue-controlled chrominance signal.

FIG. 4 is a block diagram illustrating a detailed circuit configuration of the color hue controller 112. As shown in FIG. 4, the color hue controller 112 serves to rotate or shift the coordinate axes of the chrominance signals Cb and Cr, as shown in FIG. 5, thereby achieving a variation in color. The hue of the chrominance signals Cb and Cr, which is the color represented by the color vector A, as shown in FIG. 5, may often be unacceptable to the viewer due to an inadequate chrominance signal phase sampling or a particular visual response of the viewer. In such a case, the viewer adjusts the hue of the chrominance signals Cb and Cr by varying the rotation angle or phase angle of the color vector A, while observing the display state of the television receiver, until a desired hue is obtained. In accordance with a viewer's adjustment of the hue, the coordinate axes of the chrominance signals Cb and Cr are rotated or shifted, thereby controlling the hue of the color vector A.

When the viewer shifts the coordinate axes of the chrominance signals Cb and Cr by an angle of θ in order to obtain a desired hue, the color hue control coefficient is set to "θ". In this case, a color hue control coefficient value of "cos θ" or "−sin θ" is input to the color hue controller 112 via a first switch 402 which is coupled to the values "cos θ" and "−sin θ," associated with the chrominance signals Cb and Cr, respectively. Another color hue control coefficient value of "sin θ" or "cos θ" is input to the color hue controller 112 via a second switch 408 which is coupled to the values "sin θ" and "cos θ," associated with the chrominance signals Cb and Cr, respectively. In a first multiplier 400, the chrominance signal Cb, which is input to the color hue controller 112, is multiplied by "cos θ" applied to the first multiplier 400 in accordance with a switching operation of the first switch 402. The resultant value from the first multiplier 400 is stored in a first delay 404. In a second multiplier 406, the input chrominance signal Cb is also multiplied by "sin θ" applied to the second multiplier 406 in accordance with a switching operation of the second switch 408. The resultant value from the second multiplier 406 is stored in a second delay 410. After completing the multiplication operations for the input chrominance signal Cb, multiplication operations for the input chrominance signal Cr are conducted in the first and second multipliers 400 and 406 using values of "−sin θ" and "cos θ," respectively. After performing the multiplication operation for the input chrominance signal Cr, the resultant product value is outputted from the first multiplier 400 and inputted into a first adder 412 which adds the product value to the value received from the first delay 404, having the input chrominance signal Cb. The resultant value from the first adder 412 is applied to a first input terminal of a third switch 414. Also, after the multiplication operation for the input chrominance signal Cr, the resultant value is outputted from the second multiplier 406 and applied to a second adder 416 which, in turn, adds this value to the value received from the second delay 410, having the input chrominance signal Cb. The resultant value from the second adder 416 is applied to the second input terminal of the third switch 414. Thus, hue-controlled chrominance signals Cb_h and Cr_h are sequentially output in accordance with a switching operation of the third switch 414. The respective values of the output signals from the color hue controller 112 associated with the luminance signal Y and the chrominance signals Cb and Cr can be expressed as follows:

$Y=Y$ $Cb\_h = Cb \times \cos θ − Cr \times \sin θ$ $Cr\_h = Cb \times \sin θ + Cr \times \cos θ$ [Equation 2]

The above Equation 2 may be expressed in the form of a matrix equation as follows:

$$\begin{bmatrix} Y \\ Cb\_h \\ Cr\_h \end{bmatrix} = \begin{bmatrix} 1 & 0 & 0 \\ 0 & \cos θ & -\sin θ \\ 0 & \sin θ & \cos θ \end{bmatrix} \times \begin{bmatrix} Y \\ Cb \\ Cr \end{bmatrix}$$ [Equation 2a]

In the above Equation 2a, "θ" represents the shift angle of the coordinate axes.

FIG. 6 is a block diagram illustrating a detailed circuit configuration of the flesh tone controller 114. As shown in FIG. 6, the flesh tone controller 114 serves to correct colors near the skin color. When the phase angle of the coordinate axis of the chrominance signal Cr is shifted by an angle of θ', the flesh tone control coefficient used in the flesh tone controller 114 is set to "θ'". In this case, a flesh tone control coefficient value of "sin θ'" or "cos θ'" is input to the flesh tone controller 114 via a first switch 600 which is coupled to those values "sin θ'" and "cos θ'" associated with the chrominance signals Cb and Cr, respectively. Since the flesh tone controller 114 is adapted to only shift the coordinate axis of the chrominance signal Cr, the chrominance signal Cb, which is inputted to the flesh tone controller 114, is directly applied to a first input terminal of a second switch 602. The chrominance signal Cb is selectively outputted from the flesh tone controller 114, without being changed, in accordance with a switching operation of the second switch 602. The input chrominance signal Cb is also applied to a multiplier 604. In the multiplier 604, the input chrominance signal Cb is multiplied by "sin θ'" applied to the multiplier 604 in accordance with a switching operation of the first switch 600. The resultant value outputted from the multiplier 604 is stored in a delay 606. Subsequently, the chrominance signal Cr, is inputted into the flesh tone controller 114, following the chrominance signal Cb, and is multiplied by "cos θ'" in the multiplier 604. The resultant value output from the multiplier 604 after the multiplication operation for the input chrominance signal Cr is then applied to an adder 608 for adding to it the value received from the delay 606 associated with the input chrominance signal Cb. The resultant value from the adder 608 is applied to the second input terminal of the second switch 602. The second switch 602 successively outputs from the flesh tone controller 114 the value received from the adder 608 along with the chrominance signal Cb not processed in the flesh tone controller.

The output signal values from the flesh tone controller 114 associated with the luminance signal Y and chrominance signals Cb and Cr, respectively, can be expressed as follows:

$Y=Y$ $Cb\_f = Cb$ $Cr\_f = Cb \times \sin θ' + Cr \times \cos θ'$ [Equation 3]

The above Equation 3 may be expressed in the form of a matrix equation as follows:

$$\begin{bmatrix} Y \\ Cb\_f \\ Cr\_f \end{bmatrix} = \begin{bmatrix} 1 & 0 & 0 \\ 0 & 1 & 0 \\ 0 & \sin θ' & \cos θ' \end{bmatrix} \times \begin{bmatrix} Y \\ Cb \\ Cr \end{bmatrix}$$ [Equation 3a]

Figure 8:
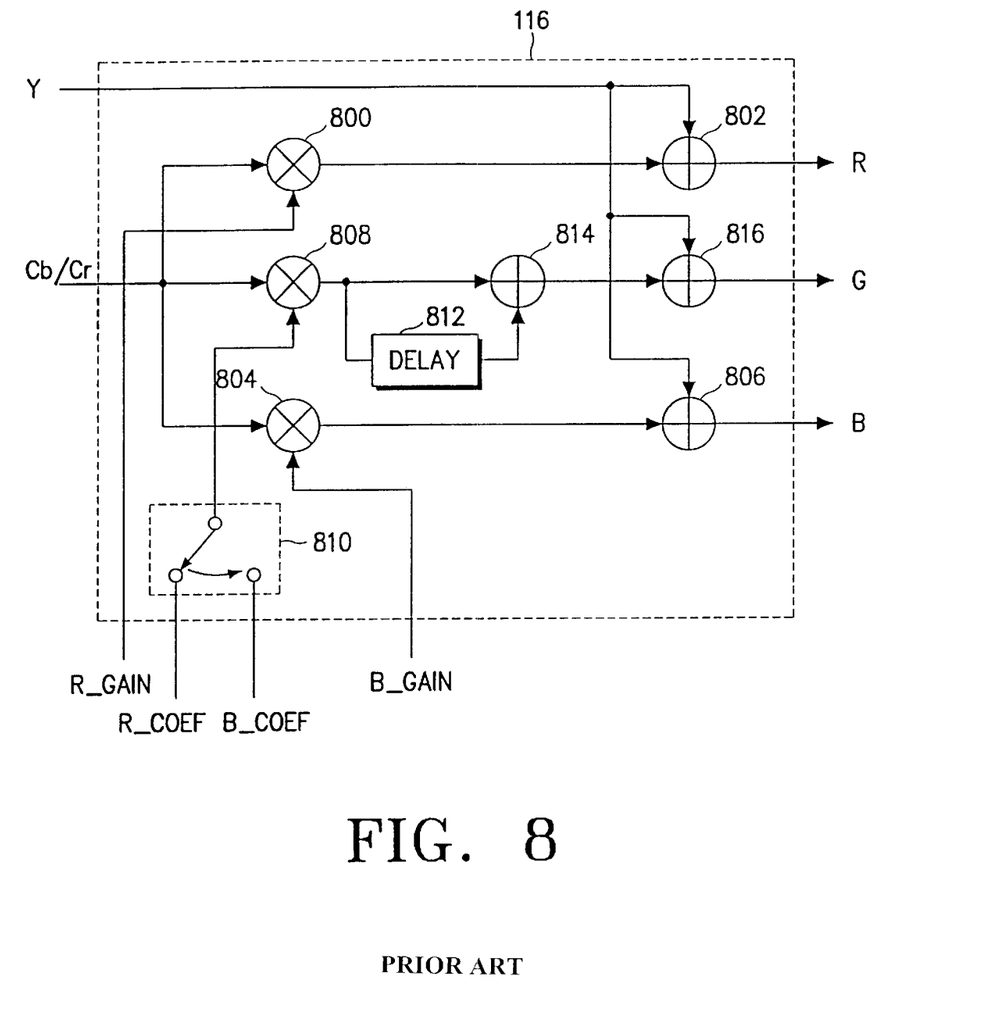
FIG. 8 is a block diagram illustrating a detailed circuit configuration of a conventional RGB transform unit shown in FIG. 1.

FIG. 8 is a block diagram illustrating a detailed circuit configuration of the RGB transform unit 116. As shown in FIG. 8, the RGB transform unit 116 processes the chrominance signals Cb_f and Cr_f received from the flesh tone controller 114 along with the luminance signal Y, thereby transforming those signals to an original RGB signal in a conventional fashion. The resultant signals, namely, R, G and B signals, from the RGB transform unit 116 are then sent to the television receiver. That is, the chrominance signal Cr, which is input to the RGB transform unit 116, is multiplied by a gain control coefficient R_GAIN for R-Y chrominance signals in a first multiplier 800. The resultant signal from the first multiplier 800 is applied to a first adder 802 which, in turn, adds that signal to the luminance signal Y applied thereto. The resultant signal from the first adder 802 is output as the R (red) signal. The input chrominance signal Cr is also applied to a second multiplier 808. In the second multiplier 808, the input chrominance signal Cr is multiplied by "R_COEF" applied to the second multiplier 808 via a switch 810. The switch 810 is coupled to chrominance signal control coefficients of "R_COEF" and "B_COEF" for G (green) color values respectively associated with the chrominance signals Cr and Cb in order to selectively apply "R_COEF" or "B_COEF" to the second multiplier 808 in accordance with its switching operation. The resultant value from the second multiplier 808 is stored in a delay 812. The input chrominance signal Cr is also applied to a third multiplier 804 which, in turn, multiplies the input chrominance signal Cr by a gain control coefficient B_GAIN for B-Y chrominance signals. The resultant signal from the third multiplier 804 is applied to a third adder 806 which, in turn, adds that signal to the luminance signal Y applied thereto. The resultant signal from the third adder 806 is prevented from being output as the B (blue) signal in accordance with a switching operation of a switch (not shown). Subsequently, the chrominance signal Cb, which is inputted into the RGB transform unit 116, following the chrominance signal Cr, is applied to the multipliers 800, 808, and 804, respectively. Although the input chrominance signal Cb applied to the first multiplier 800 is processed in the same manner as that for the chrominance signal Cr applied to the first multiplier 800, its resultant signal is prevented from being outputted from the first adder 802 as the R (red) signal. The input chrominance signal Cb applied to the second multiplier 808 is multiplied by "B_COEF" applied to the second multiplier 808 via the switch 810. The resultant value from the second multiplier 808 is then applied to a fourth adder 814 which, in turn, adds that value to the value received from the delay 812 associated with the input chrominance signal Cr. The resultant value from the fourth adder 814 is applied to a second adder 816. In the second adder 816, the signal output from the fourth adder 814 is added to the luminance signal Y applied to the second adder 816. The resultant signal from the second adder 816 is outputted as the G (green) signal. Meanwhile, the input chrominance signal Cb applied to the third multiplier 804 is processed in the same manner as that for the input chrominance signal Cr applied to the third multiplier 804. The resultant signal from the third adder 806 is output as the B (blue) signal. Accordingly, the R, G, and B signals output from the RGB transform unit 116 can be expressed as follows:

$$R = Y + R\_GAIN \times Cr$$

$$G = Y + B\_COEF \times Cb + R\_COEF \times Cr$$

$$B = Y + B\_GAIN \times Cb \qquad \text{[Equation 4]}$$

The above Equation 4 may be expressed in the form of a matrix equation as follows:

$$\begin{bmatrix} R \\ G \\ B \end{bmatrix} = \begin{bmatrix} 1 & 0 & R\_GAIN \\ 1 & B\_COEF & R\_COEF \\ 1 & B\_GAIN & 0 \end{bmatrix} \times \begin{bmatrix} Y \\ Cb \\ Cr \end{bmatrix} \qquad \text{[Equation 4a]}$$

As apparent from the above description, conventional video signal processing devices are equipped with respective circuits for the chrominance signal control and RGB transform functions. When one desires to add another function, it is necessary to provide an additional circuit for performing the added function. For instance, when it is desired to add another chrominance signal control function, a chrominance signal control circuit for the added chrominance signal control function must be provided. Due to the need for an additional chrominance signal control circuit, the entire circuit configuration becomes complex. Furthermore, additional components increase the cost of producing a device.

SUMMARY OF THE INVENTION

Accordingly, an object of the invention is to provide a chrominance signal processing apparatus in a video signal processing system which has a simple configuration capable of achieving chrominance signal control and RGB transform functions using a single circuit.

In accordance with the present invention, this object is accomplished by providing a chrominance signal processing apparatus in a video signal processing system comprising: a key input unit provided with a plurality of control keys for chrominance signal controls, the key input unit serving to generate key data in response to a manipulation of desired control keys by the user; a chrominance signal control coefficient computing unit adapted to calculate chrominance signal control coefficients in response to a user's request for chrominance signal controls received via the key input unit, respectively, the calculation of the chrominance signal control coefficients being carried out in accordance with a matrix computation for variations in chrominance signal coefficients respectively associated with the chrominance signal control coefficients to be calculated; and a chrominance signal control and RGB transform unit adapted to conduct the requested chrominance signal controls for chrominance signals separated from a video signal, along with a luminance signal, by a comb filter of the video signal processing system, based on the chrominance signal control coefficients received from the chrominance signal control coefficient computing unit, and adding the controlled chrominance signals to the luminance signal, respectively, thereby outputting R, G, and B video signals.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in greater detail to the preferred embodiments of the present invention. In the following description, made in conjunction with a preferred embodiment of the present invention, a variety of specific elements such as concrete processing flows are described. The description of such elements is made only to provide a better understanding of the present invention. Those skilled in the art will appreciate that the present invention can be implemented without using the above mentioned specific elements. In the following description of the present invention, a detailed description of known functions and configurations incorporated herein is omitted.

Figure 9:
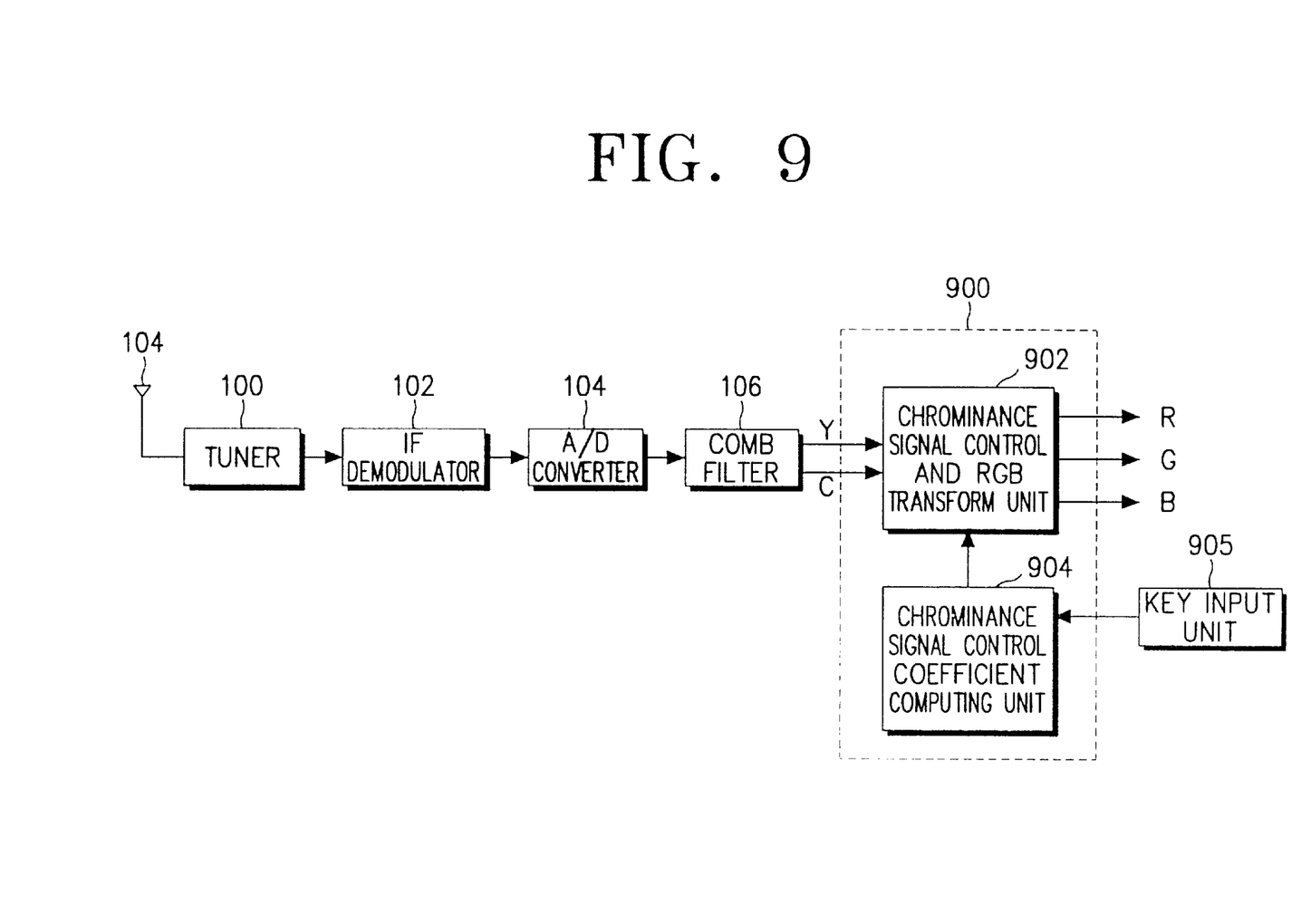
FIG. 9 is a block diagram illustrating a digital television receiver equipped with a chrominance signal processing apparatus configured in accordance with an embodiment of the present invention.

FIG. 9 is a block diagram illustrating a digital television receiver equipped with a chrominance signal processing apparatus configured to conduct both color signal control and RGB transform functions in accordance with an embodiment of the present invention. Referring to FIG. 9, a key input unit 905 is provided with a plurality of control keys for adjusting a variety of color signals. In response to a user's manipulation of selected control keys, the key input unit 905 generates key data. A chrominance signal control coefficient computing unit 904 calculates chrominance signal control coefficients in response to control signals inputted in accordance with a user's manipulations of the desired control keys of the key input unit 905. In the chrominance signal control coefficient computing unit 904, the calculation of chrominance signal control coefficients is carried out in accordance with a matrix computation. The array of numbers in the matrix correspond to variations in chrominance signal coefficients associated with the chrominance signal control coefficients used in subsequent calculations. The calculated chrominance signal control coefficients are applied to a chrominance signal control and RGB transform unit 902. The chrominance signal control coefficient computing unit 904 may comprise a micro computer or computing circuit. The chrominance signal control coefficients generated in accordance with the matrix computation conducted in the chrominance signal control coefficient computing unit 904, for variations in chrominance signal coefficients and associated chrominance signal control coefficients, are the same as those obtained using conventional circuits. This will now be verified by comparing the results obtained when the chrominance signal coefficients are computed using the matrix computation with the results obtained when the chrominance signals Cb and Cr are sequentially processed by chrominance signal control units, such as the color gain controller 110, color hue controller 112, and flesh tone controller 114 shown in FIG. 1.

First, a description is provided for the equation representing the output obtained from sequentially processing the chrominance signals, Cb and Cr, received from the comb filter 106 of FIG. 1, by the chrominance signal controllers of FIG. 1. In the final step, an RGB transform is performed on signals outputted from the last processing unit of the chrominance signal controllers.

As in Equation 1, the values of signals outputted from the color gain controller 110, which represent a color gain control conducted on the chrominance signals Cb and Cr, are expressed as follows, along with the luminance signal Y:

$$Y=Y$$
$$Cb\_g=Cb \times G$$
$$Cr\_g=Cr \times G \qquad \text{[Equation 5]}$$

Next, Equation 6 represents the values of signals outputted from the color hue controller 112, which represents the color hue control conducted at a variation in hue of θ, performed on the color gain-controlled chrominance signals Cb_g and Cr_g output from the color gain controller 110. The luminance signal Y is also shown.

$$Y=Y$$
$$Cb\_h=Cb\_g \times \cos\theta - Cr\_g \times \sin\theta$$
$$Cr\_h=Cb\_g \times \sin\theta + Cr\_g \times \cos\theta \qquad \text{[Equation 6]}$$

Equation 6 can be expressed in accordance with the chrominance signals Cb and Cr output from the comb filter 106, as follows:

$$Y=Y$$
$$Cb\_h=G \times Cb \times \cos\theta - G \times Cr \times \sin\theta$$
$$Cr\_h=G \times Cb \times \sin\theta + G \times Cr \times \cos\theta \qquad \text{[Equation 7]}$$

The values of output signals from the flesh tone controller 114, resulting from a flesh tone control conducted at a shift angle θ' of the Cr coordinate axis for the color hue-controlled chrominance signals Cb_g and Cr_g, received from the color gain controller 110 is expressed in Equation 8. The luminance signal Y is also shown.

$$Y=Y$$
$$Cb\_f=Cb\_h$$
$$Cr\_f=Cb\_h \times \sin\theta' + Cr\_h \times \cos\theta' \qquad \text{[Equation 8]}$$

When the terms of Equation 8 are replaced with corresponding terms of Equation 7, Equation 8 can be expressed in accordance with the chrominance signals Cb and Cr output from the comb filter 106, as follows:

$$Y = Y \qquad \text{[Equation 9]}$$
$$Cb\_f = Cb\_h = G \times Cb \times \cos\theta - G \times Cr \times \sin\theta$$
$$\begin{aligned}Cr\_f &= Cb\_h \times \sin\theta' + Cr\_h \times \cos\theta' \\ &= (G \times Cb \times \cos\theta - G \times Cr \times \sin\theta)\sin\theta' + \\ &\quad (G \times Cb \times \cos\theta - G \times Cr \times \sin\theta)\cos\theta' \\ &= G(\sin\theta'\cos\theta + \cos\theta'\sin\theta)Cb + \\ &\quad G(\cos\theta'\cos\theta - \sin\theta'\sin\theta)Cr \\ &= G \cdot \sin(\theta + \theta')Cb + G \cdot \cos(\theta + \theta')Cr\end{aligned}$$

The chrominance signals Cb_f and Cr_f, resulting from the above mentioned flesh tone control and the luminance signal Y, are subject to an RGB transform in the RGB transform unit 116 of FIG. 1. With the terms "G·cos θ", "−G·sin θ", "G·sin(θ+θ')", and "G·cos(θ+θ')" of Equation 9 are replaced by "A", "B", "C", and "D", respectively, the values of R, G and B signals output from the RGB transform unit 116 can be expressed as follows:

$$\begin{aligned}R &= Y + R\_GAIN \times Cr\_f \qquad \text{[Equation 10]} \\ &= Y + R\_GAIN(C \cdot Cb + D \cdot Cr) \\ &= Y + C \times R\_GAIN \times Cb + D \times R\_GAIN \times Cr\end{aligned}$$

$$\begin{aligned}G &= Y + B\_COEF \times Cb\_f + R\_COEF \times Cr\_f \\ &= Y + B\_COEF \times (A \cdot Cb + B \cdot Cr) + R\_COEF \times \\ &\quad (C \cdot Cb + D \cdot Cr) \\ &= Y + (A \times B\_COEF + C \times R\_COEF)Cb + \\ &\quad (B \times B\_COEF + D \times R\_COEF)Cr\end{aligned}$$

$$\begin{aligned}B &= Y + B\_GAIN \times Cb\_f \\ &= Y + B\_GAIN \times (A \cdot Cb + B \cdot Cr) \\ &= Y + A \times B\_GAIN \times Cb + B \times B\_GAIN \times Cr\end{aligned}$$

Equation 11 verifies that the results obtained in accordance with a matrix computation for the coefficients used in the above mentioned chrominance signal controllers are the same as the values of R, G and B signals obtained by sequentially processing the chrominance signals in the above mentioned chrominance signal controllers, and then conducting an RGB transform on signals output from the final one of those chrominance signal controllers. Equation 11 uses the coefficients of Equations 1a, 2a and 3a to conduct the above mentioned matrix computation:

$$\begin{bmatrix} Y \\ Cb\_f \\ Cr\_f \end{bmatrix} = \begin{bmatrix} 1 & 0 & 0 \\ 0 & 1 & 0 \\ 0 & \sin\theta' & \cos\theta' \end{bmatrix} \times \begin{bmatrix} 1 & 0 & 0 \\ 0 & \cos\theta & -\sin\theta \\ 0 & \sin\theta & \cos\theta \end{bmatrix} \times$$

$$\begin{bmatrix} 1 & 0 & 0 \\ 0 & G & 0 \\ 0 & 0 & G \end{bmatrix} \times \begin{bmatrix} Y \\ Cb \\ Cr \end{bmatrix}$$

$$= \begin{bmatrix} 1 & 0 & 0 \\ 0 & G\cdot\cos\theta & -G\cdot\sin\theta \\ 0 & G\cdot\sin(\theta+\theta') & G\cdot\cos(\theta+\theta'') \end{bmatrix} \times \begin{bmatrix} Y \\ Cb \\ Cr \end{bmatrix}$$

[Equation 11]

After conducting a matrix computation for Equation 11, the following results are obtained:

$Y = Y$ $Cb\_f = G \times Cb \times \cos\theta - G \times Cr \times \sin\theta$ $Cr\_f = G\cdot\sin(\theta+\theta')Cb + G\cdot\cos(\theta+\theta')Cr$     [Equation 12]

It is found that Equation 12 is the same as Equation 9, which represents the values signal outputted from the flesh tone controller 114 of FIG. 1. Equation 9 results from the flesh tone control conducted for the color hue-controlled chrominance signals Cb_g and Cr_g, and the chrominance signals Cb and Cr received from the comb filter Cb and Cr.

When the terms of Equation 4a are replaced with corresponding terms of Equation 11, wherein the terms "G·cos θ", "–G·sin θ", "G·sin(θ+θ')", and "G·cos(θ+θ')" in Equation 11 are replaced with "A", "B", "C", and "D", respectively, the following Equation 13 is obtained:

$$\begin{bmatrix} R \\ G \\ B \end{bmatrix} = \begin{bmatrix} 1 & 0 & R\_GAIN \\ 1 & B\_COEF & R\_COEF \\ 1 & B\_GAIN & 0 \end{bmatrix} \times \begin{bmatrix} 1 & 0 & 0 \\ 0 & A & B \\ 0 & C & D \end{bmatrix} \times \begin{bmatrix} Y \\ Cb \\ Cr \end{bmatrix}$$

$$= \begin{bmatrix} 1 & C\times R\_GAIN & D\times R\_GAIN \\ 1 & A\times B\_COEF+C\times R\_COEF & B\times B\_COEF+D\times R\_COEF \\ 1 & A\times B\_GAIN & B\times B\_GAIN \end{bmatrix} \times$$

$$\begin{bmatrix} Y \\ Cb \\ Cr \end{bmatrix}$$

[Equation 13]

After conducting a matrix computation for Equation 13, the following results are obtained:

$R = Y + C \times R\_GAIN \times Cb + D \times R\_GAIN \times Cr$ $G = Y + (A \times B\_COEF + C \times R\_COEF)Cb + (B \times B\_COEF + D \times R\_COEF)Cr$ $B = Y + A \times B\_GAIN \times Cb + B \times B\_GAIN \times Cr$     [Equation 14]

It is found that Equation 14 is the same as Equation 10 representing the R, G and B signals finally output from the RGB transform unit 116 of FIG. 1.

It is apparent from the above description that sequentially processing the chrominance signals in the above mentioned chrominance signal controllers and then conducting an RGB transform for signals outputted from the last processing unit provides results equivalent to those obtained in accordance with a matrix computation for variations of the coefficients respectively used in the above mentioned chrominance signal controllers in association with the luminance signal and chrominance signals.

Accordingly, it is verified that the chrominance signal control coefficient computing unit 904 produces respective control coefficients for appropriate chrominance signal controls in accordance with a matrix computation for variations of chrominance signal coefficients used to achieve those chrominance signal controls. Referring to FIG. 9, the chrominance signal control and RGB transform unit 902 conducts a chrominance signal control for the chrominance signals Cb and Cr received from the comb filter 106, based on the chrominance signal control coefficients received from the chrominance signal control coefficient computing unit 904. The chrominance signal control and RGB transform unit 902 then conducts an RGB transform for the resultant signals obtained after its chrominance signal control, along with the luminance signal Y, thereby outputting a video signal.

Figure 10:
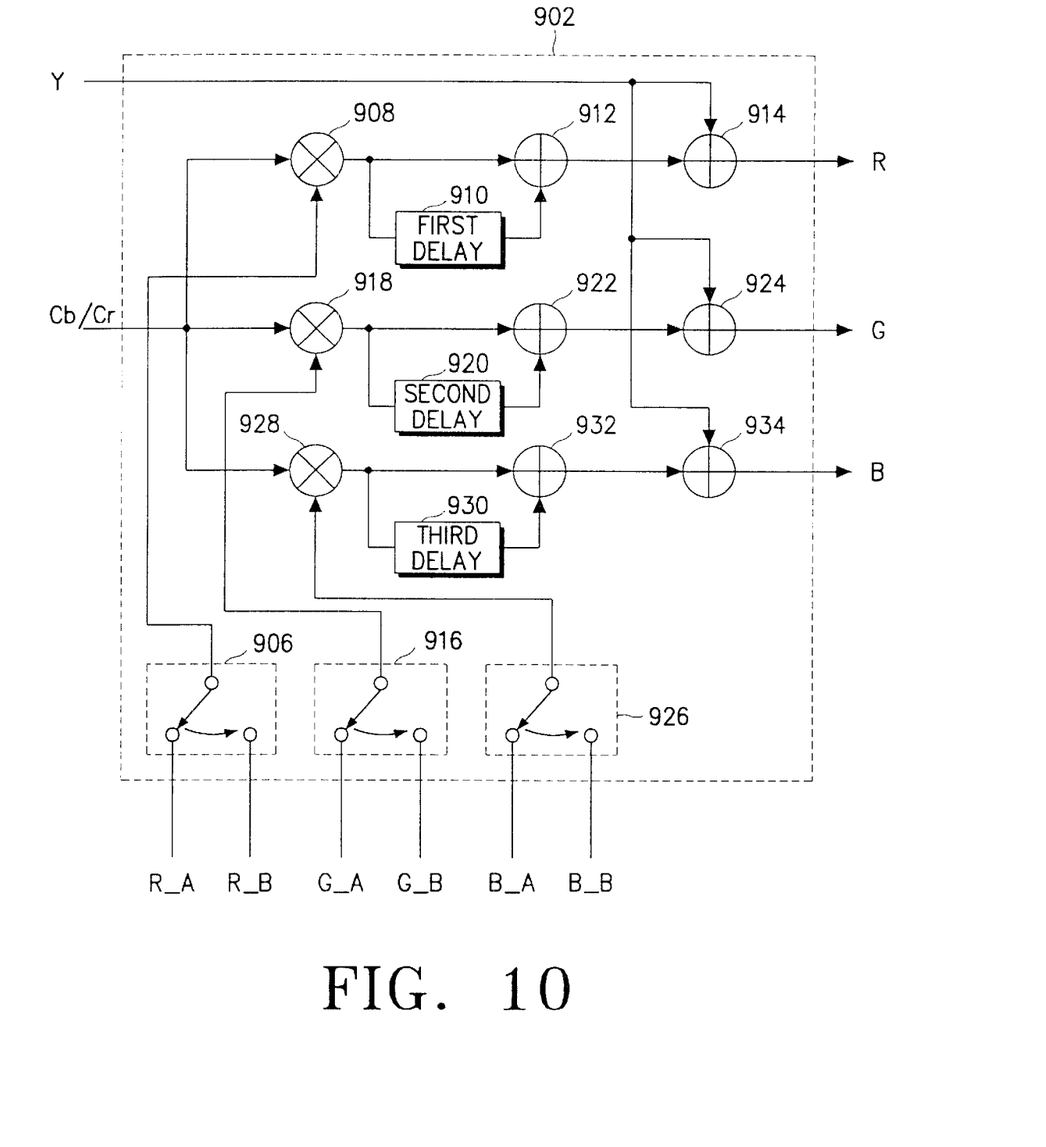
FIG. 10 is a block diagram illustrating a detailed configuration of the chrominance signal processing apparatus shown in FIG. 9.

FIG. 10 illustrates a detailed circuit configuration of the chrominance signal control and RGB transform unit 902 of FIG. 9 in accordance with an embodiment of the present invention. As shown in FIG. 10, the chrominance signal Cb, which is inputted into the chrominance signal control and RGB transform unit 902, is applied to a first multiplier 908. In the first multiplier 908, the input chrominance signal Cb is multiplied by a chrominance signal control coefficient "R_A" applied to the first multiplier 908 via a first switch 906. The first switch 906 is coupled to chrominance signal control coefficients of "R_A" and "R_B" for R (red) color values respectively associated with the chrominance signals Cb and Cr in order to selectively apply "R_A" or "R_B" to the first multiplier 908 in accordance with its switching operation. The resultant value from the first multiplier 908 is stored in a first delay 910. The input chrominance signal Cb is also applied to a second multiplier 918. In the second multiplier 918, the input chrominance signal Cb is multiplied by a chrominance signal control coefficient "G_A" applied to the second multiplier 918 via a second switch 916. The second switch 916 is coupled to chrominance signal control coefficients of "G_A" and "G_B" for G (green) color values associated with the chrominance signals Cb and Cr, respectively, in order to selectively apply "G_A" or "G_B" to the second multiplier 918 in accordance with its switching operation. The resultant value from the second multiplier 918 is stored in a second delay 920. The input chrominance signal Cb is also applied to a third multiplier 928. In the third multiplier 928, the input chrominance signal Cb is multiplied by a chrominance signal control coefficient "B_A" applied to the third multiplier 928 via a third switch 926. The third switch 926 is coupled to chrominance signal control coefficients of "B_A" and "B_B" for B (blue) color values respectively associated with the chrominance signals Cb and Cr in order to selectively apply "B_A" or "B_B" to the third multiplier 928 in accordance with its switching operation. The resultant value from the third multiplier 928 is stored in a third delay 930.

Subsequently, the chrominance signal Cr, which is input to the chrominance signal control and RGB transform unit 902, following the chrominance signal Cb, is applied to the multipliers 908, 918, and 928, respectively. In the first multiplier 908, the input chrominance signal Cr is multiplied by a chrominance signal control coefficient "R_B" applied to the first multiplier 908 via the first switch 906. The resultant signal from the first multiplier 908 is applied to a first adder 912 which adds that signal to the value received from the first delay 910 and associated with the input chrominance signal Cr. The resultant signal from the first adder 912 is then applied to a second adder 914 which adds that value to the luminance signal Y applied thereto. The resultant signal from the second adder 914 is output as an R (red) signal. In the second multiplier 918, the input chrominance signal Cr is multiplied by a chrominance signal control coefficient "G_B" applied to the second multiplier 918 via the second switch 916. The resultant signal from the second multiplier 918 is applied to a third adder 922 which adds that signal to the value received from the second delay 920 and associated with the input chrominance signal Cr. The resultant signal from the third adder 922 is then applied to a fourth adder 924 which adds that value to the luminance signal Y applied thereto. The resultant signal from the fourth adder 924 is output as a G (green) signal. On the other hand, in the third multiplier 928, the input chrominance signal Cr is multiplied by a chrominance signal control coefficient "B_B" applied to the third multiplier 928 via the third switch 926. The resultant signal from the third multiplier 928 is applied to a fifth adder 932 which adds that signal to the value received from the third delay 930 and associated with the input chrominance signal Cr. The resultant signal from the fifth adder 932 is then applied to a sixth adder 934 which, in turn, adds that value to the luminance signal Y applied thereto. The resultant signal from the sixth adder 934 is output as a B (blue) signal. Assuming that the chrominance signal control coefficients "R_A", "R_B", "G_A", "G_B", "B_A", and "B_B" correspond to "C×R_GAIN", "D×R_GAIN", "A×B_COEF+C×R_COEF", "B×B_COEF+D×R_COEF", "A×B_GAIN", and "B × B_GAIN", the R, G, and B signals output from the chrominance signal control and RGB transform unit 902 can be expressed as follows:

$$R = Y + C \times R\_GAIN \times Cb + D \times R\_GAIN \times Cr$$

$$G = Y + (A \times B\_COEF + C \times R\_COEF)Cb + (B \times B\_COEF + D \times R\_COEF)Cr$$

$$B = Y + A \times B\_GAIN \times Cb + B \times B\_GAIN \times Cr \quad [\text{Equation 15}]$$

It is shown that Equation 15 is the same as Equation 14. That is, it is found that the R, G, and B signals finally output from the chrominance signal processing apparatus are those reflecting variations of luminance and chrominance signal coefficients for color controls.

As apparent from the above description, it is possible to achieve both the chrominance signal control function and RGB transform function using a single chrominance signal processing unit in accordance with the present invention. Therefore, the hardware configuration for those functions is simplified, as compared to conventional configurations in which a variety of independent chrominance signal control circuits such as a color gain controller, a color hue controller, and a flesh tone controller should be used.

While this invention has been described in connection with what is presently considered to be the most practical and preferred embodiment, it is to be understood that the invention is not limited to the disclosed embodiment, rather, it is intended to cover various modifications within the spirit and scope of the appended claims. For instance, although the preferred embodiment of the present invention has been described in conjunction with chrominance signal control functions, namely, a color gain control, a color hue control, and a flesh tone control, along with an RGB transform function, the present invention may be equivalently applied to a case in which gain controls for a luminance signal are achieved.

What is claimed is:

1. A chrominance signal processing apparatus in a video signal processing system comprising:

a key input unit having a plurality of control keys for adjusting chrominance signals by generating key data;

a chrominance signal control coefficient computing unit adapted to calculate chrominance signal control coefficients in response to said key data received from said key input unit, wherein said calculation of said chrominance signal control coefficients is performed using a matrix computation based on variations of chrominance signal coefficients; and a chrominance signal control and RGB transform unit adapted to adjust said chrominance signals based upon said chrominance signal control coefficients received from said chrominance signal control coefficient computing unit, and adding said controlled chrominance signals to a luminance signal, respectively, to output R, G, and B video signals, wherein said chrominance signal control and RGB transform unit comprises:

a plurality of switches, each associated with one of said R, G, and B signals, wherein each of said plurality of switches is adapted to sequentially select one of said chrominance signal control coefficients corresponding to a respective one of said chrominance signals;

a plurality of multipliers, each coupled to a respective one of said plurality of switches and adapted to sequentially receive a respective one of said chrominance signals, wherein each of said multipliers multiplies said respective one of said chrominance signals and said respective one of said chrominance signal control coefficients outputted from a corresponding one of said plurality of switches;

a plurality of delays, wherein each of said plurality of delays is adapted to delay an output received from a corresponding one of said plurality of multipliers for a predetermined sample period;

a plurality of first adders, wherein each of said plurality of first adders is adapted to add an output received from a corresponding one of said plurality of multipliers and an output received from a corresponding one of said plurality of delays; and a plurality of second adders, wherein each of said plurality of second adders is adapted to add said luminance signal and a corresponding output from said plurality of first adders, and wherein each of said plurality of second adders outputs a corresponding one of said R, G, and B video signals.

2. The chrominance signal processing apparatus according to claim 1, wherein said plurality of control keys are manually adjusted.

3. The chrominance signal processing apparatus according to claim 1, wherein said luminance signal is separated from a video signal by a comb filter.

4. The chrominance signal processing apparatus according to claim 1, wherein said chrominance signals are separated from a video signal by a comb filter.

5. The chrominance signal processing apparatus according to claim 1, wherein said luminance signal is separated from a video signal by a comb filter.

6. The chrominance signal processing apparatus according to claim 1, wherein said predetermined sample period is one sample period.

7. A chrominance signal processing apparatus in a digital television receiver including a tuner for tuning to a selected one of a plurality of channels carrying video signals received via an antenna, an intermediate frequency demodulator for demodulating said video signal output from said tuner into an intermediate frequency signal, an analog/digital converter for converting said intermediate frequency-modulated video signal output from said intermediate frequency demodulator into a digital signal, and a comb filter for separating said digital signal from said analog/digital converter into a luminance signal and chrominance signals, said chrominance signal processing apparatus comprising:

a key input unit having a plurality of control keys for adjusting chrominance signals by generating key data;

a chrominance signal control coefficient computing unit adapted to calculate chrominance signal control coefficients in response to said key data received from said key input unit, wherein said calculation of said chrominance signal control coefficients is performed using a matrix computation based on variations of chrominance signal coefficients; and a chrominance signal control and RGB transform unit adapted to adjust said chrominance signals based upon said chrominance signal control coefficients received from said chrominance signal control coefficient computing unit, and adding said controlled chrominance signals to a luminance signal, respectively, to output R, G, and B video signals, wherein said chrominance signal control and RGB transform unit comprises:

a plurality of switches, each associated with one of said R, G, and B signals, wherein each of said plurality of switches is adapted to sequentially select one of said chrominance signal control coefficients corresponding to a respective one of said chrominance signals;

a plurality of multipliers, each coupled to a respective one of said plurality of switches and adapted to sequentially receive a respective one of said chrominance signals, wherein each of said multipliers multiplies said respective one of said chrominance signals and said respective one of said chrominance signal control coefficients outputted from a corresponding one of said plurality of switches;

a plurality of delays, wherein each of said plurality of delays is adapted to delay an output received from a corresponding one of said plurality of multipliers for a predetermined sample period;

a plurality of first adders, wherein each of said plurality of first adders is adapted to add an output received from a corresponding one of said plurality of multipliers and an output received from a corresponding one of said plurality of delays; and a plurality of second adders, wherein each of said plurality of second adders is adapted to add said luminance signal and a corresponding output from said plurality of first adders, and wherein each of said plurality of second adders outputs a corresponding one of said R, G, and B video signals.

* * * * *